United States Patent [19]

Deex et al.

[11] 4,115,357

[45] * Sep. 19, 1978

[54] POLYESTERS OF 1,2-BIS(HYDROXYPHENYL)ETHANES AND AROMATIC DICARBOXYLIC ACIDS

[75] Inventors: Oliver D. Deex, Clayton, Mo.; Virgil W. Weiss, Pensacola, Fla.

[73] Assignee: Monsanto Company, St. Louis, Mo.

[*] Notice: The portion of the term of this patent subsequent to Jul. 25, 1995, has been disclaimed.

[21] Appl. No.: 754,199

[22] Filed: Dec. 27, 1976

[51] Int. Cl.$^2$ .............................................. C08G 63/18
[52] U.S. Cl. ................ 528/294; 260/33.4 P; 260/DIG. 24; 528/295
[58] Field of Search .......... 260/47 C, 49, 50, DIG. 24

[56] References Cited

U.S. PATENT DOCUMENTS

| | | | |
|---|---|---|---|
| 3,028,364 | 4/1962 | Conix et al. | 260/47 |
| 3,160,602 | 12/1964 | Kantor et al. | 260/47 |
| 3,161,710 | 12/1964 | Turner | 264/216 |

*Primary Examiner*—Lester L. Lee
*Attorney, Agent, or Firm*—R. Bruce Blance; William J. Farrington; James C. Logomasini

[57] ABSTRACT

Polyesters of 1,2-bis(4-hydroxyphenyl)ethane and aromatic dicarboxylic acids exhibiting improved oxidation resistance are obtained by incorporating into the polyester, units derived from a bis(hydroxyphenyl)sulfide. In addition, the polyesters possess a combination of strength, processability, high temperature performance, resistance to burning, crystallinity and solvent resistance which makes them useful as molding resins, fibers and surface coatings.

19 Claims, 1 Drawing Figure

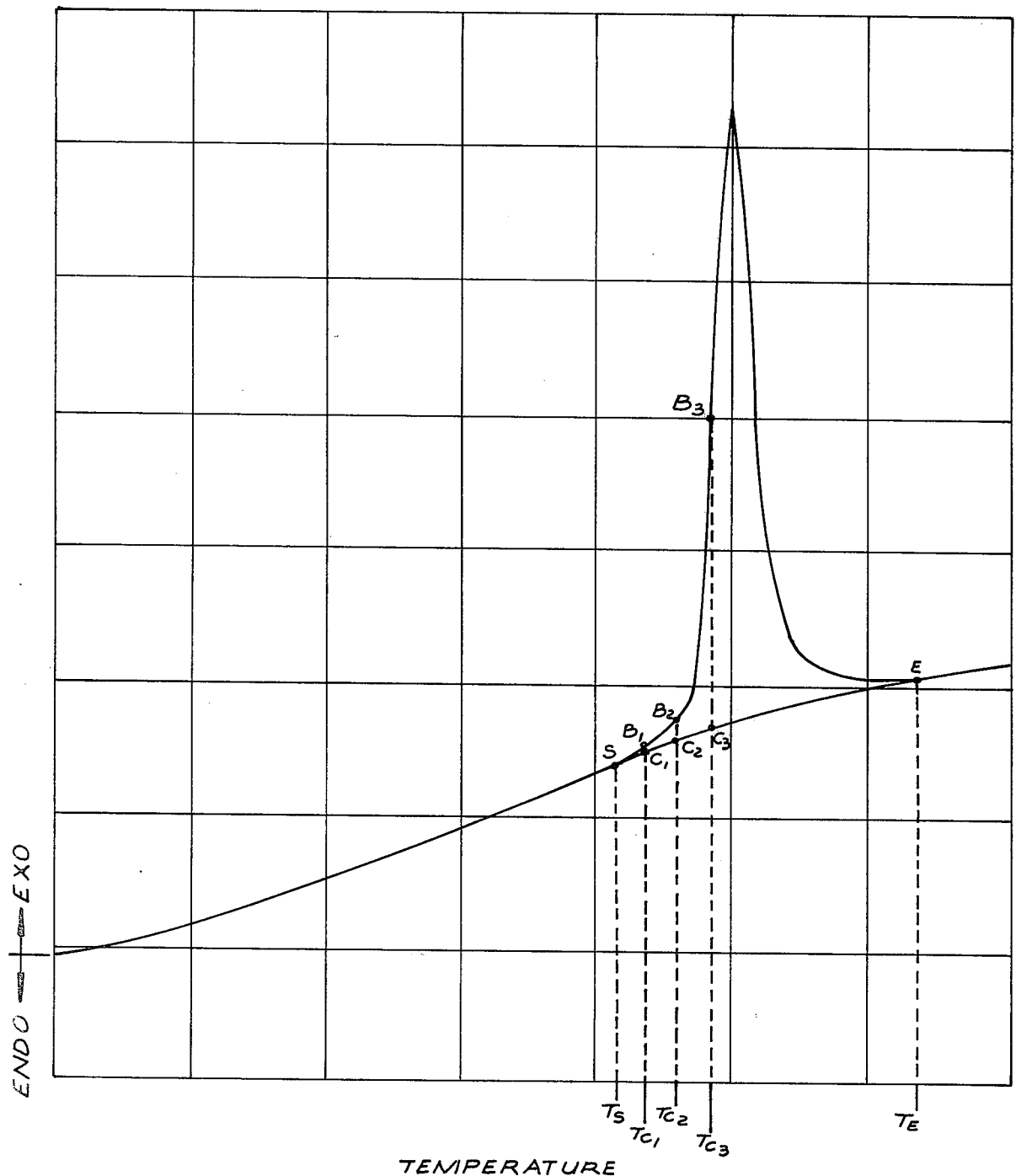

POLYESTERS OF 1,2-BIS(HYDROXYPHENYL)ETHANES AND AROMATIC DICARBOXYLIC ACIDS

1. Field of the Invention

This invention relates to polyarylene esters of aromatic dicarboxylic acids and 1,2-bis(4-hydroxphenyl)ethane and to a process of improving the oxidation resistance of such polyesters. In one aspect it relates to copolyesters of 1,2-bis(4-hydroxyphenyl)ethane and bis(4-hydroxyphenyl)sulfide.

2. Description of the Prior Art

Polyesters obtained by the condensation of 1,2-bis(-hydroxyphenyl) ethane and aromatic dicarboxylic acids have been disclosed recently and have been shown to be crystalline and to possess improved fire safety performance in comparison with analogous polyesters prepared from bisphenols such as bisphenol A. Thus, the 1,2-bis(hydroxyphenyl)ethane polyesters achieve a fire rating of V-O when they are subjected to the UL-94 test even in very thin samples of 0.08 cm and less. However, the polyesters are rather poor in oxidation resistance when they are subjected to elevated temperatures.

According to this invention polyesters of 1,2-bis(hydroxyphenyl)ethane exhibiting improved oxidation resistance are obtained by incorporating into the polyester, units derived from a bis(hydroxyphenyl)sulfide. In addition, the polyesters possess a combination of strength, processability, solvent resistance, high temperature performance and reduced afterglow when flaming combustion is terminated.

SUMMARY OF THE INVENTION

The polyarylene ester compositions of the present invention comprise the condensation product of an aromatic dicarboxylic acid and a diphenol wherein the aromatic dicarboxylic acid comprises at least one acid selected from the group consisting of isophthalic acid, terephthalic acid, bis(4-carboxyphenyl) ether, bis(4-carboxyphenyl)sulfone, bis(4-carboxyphenyl)methane and 1,2-bis-(4-carboxyphenyl)ethane and wherein the diphenol comprises from about 75 to 96 mol percent 1,2bis(4-hydroxyphenyl)ethane, from about 4 to 20 mol percent of a bis(hydroxy phenyl)sulfide and from about 21 to 0 mol percent of at least one diphenol selected from the group consisting of 1,2-bis(3-hydroxyphenyl)ethane, 1-(3-hydroxyphenyl)-2-(4-hydroxyphenyl)ethane, bis(4-hydroxyphenyl)methane, 2,2-bis(4-hydroxyphenyl)propane, bis(4-hydroxyphenyl)ether, and bis(4-hydroxyphenyl)sulfone.

The component acids and diphenols are selected so that the melting point of the polyester is less than about 350° C. and preferably so that the glass transition temperature is greater than about 100° C. The polyester condensation products may be comminuted to form molding powders and are readily molded or extruded into useful articles with desirable properties particularly improved fire safety performance, high temperature performance and solvent resistance.

THE PREFERRED EMBODIMENTS

The polyarylene esters of the present invention can be prepared from any suitable aromatic dicarboxylic acid and admixtures thereof. The preferred acids include isophthalic acid, terephthalic acid, bis(4carboxyphenyl)ether, bis(4-carboxyphenyl)sulfone, bis(4-carboxyphenyl)methane and 1,2-bis(4-carboxyphenyl)ethane, since these acids and combinations of acids can be readily combined with diphenol combinations to provide polyesters with the desired glass transition temperature ($T_g$) and melting point. A particularly preferred aromatic dicarboxylic acid is isophthalic acid and combinations thereof. Mixtures of one or more of the aromatic diacids with minor quantities, generally less than about 25 mol percent, of $C_2$ to $C_{20}$ aliphatic diacids can also be used. The quantities of aliphatic diacids in general are selected to provide improved processability without a significant loss in $T_g$ of the resulting polyesters. Preferably, the quantity is limited to a loss in $T_g$ of not more than 10° C.

The acid or admixture of acids is combined with 1,2-bis(4-hydroxyphenyl)ethane in admixture with from about 4 to 20 mol percent of a bis(hydroxyphenyl)sulfide and essentially any other suitable diphenol or mixture of diphenols to provide the aromatic polyesters of the present invention with the desired glass transition temperature and melting point. The preferred diphenols comprise at least one diphenol selected from the group consisting of 1,2-bis(3-hydroxyphenyl)ethane, 1(3-hydroxyphenyl)-2-(4-hydroxyphenyl)ethane, bis(4-hydroxyphenyl)methane, 2,2-bis(4-hydroxyphenyl)propane, bis(4-hydroxyphenyl)ether, and bis(4-hydroxyphenyl)sulfone and readily provide polyesters with the desired glass transition temperature and melting point. Suitable bis(hydroxyphenyl)sulfides which are useful in the invention are bis(4-hydroxyphenyl)sulfide, bis(2-hydroxyphenyl)sulfide, bis(2-methyl-4-hydroxyphenyl)sulfide, bis(3-methyl-4-hydroxyphenyl)sulfide, bis(2-chloro-4-hydroxyphenyl)sulfide, bis(3-chloro-4-hydroxyphenyl)sulfide, bis(2,6-dimethyl-4-hydroxyphenyl)sulfide, and bis(3,5-dimethyl-4-hydroxyphenyl)sulfide. A preferred sulfide is bis(4-hydroxyphenyl)sulfide since it does not affect the crystallization rate of the polyester appreciably.

In the preferred combinations, at least 75 mol percent of the diphenol moiety is 1,2-bis(4-hydroxyphenyl) ethane and the resulting polyester is crystalline. More preferably at least 90 mol percent of the diphenol moiety is 1,2-bis(4-hydroxyphenyl)ethane. The more preferred combinations of dicarboxylic acid and diphenol contain isophthalic acid as the major component of the acid moiety. The preferences are based on the availability and cost of the acid and desirable glass transition and melting points of the resulting polyesters. Consequently, one of the more preferred combinations is obtained from isophthalic acid and 1,2-bis(4-hydroxyphenyl)ethane containing from about 1 to 20 mol percent bis(4-hydroxyphenyl)sulfide. However, when mixtures of other aromatic diacids with isophthalic acid are used, up to 33 mol percent of such other diacid has little effect on the crystallization rate of the polyester, although some alteration in the glass transition and melting point occurs.

In addition to selection of a combination of aromatic dicarboxylic acids and diphenols containing sufficient 1,2-bis(hydroxyphenyl)ethane to provide a crystalline polyester with a melting point of less than about 350° C., the combination is preferably selected to provide a glass transition temperature of more than about 100° C. and preferably at least about 140° C. so that the polyester will display adequate resistance to stress both short and long term and dimensional stability at temperatures above about 100° C. and preferably at temperatures above 140° C. While the melting point should be less than about 350° C., it is preferably in the range of about 200° to 320° C. to provide the opportunity of creating filled polyesters with good strength at temperatures of 200° C. and higher. More preferably the melting point should be in the range of about 250° to 300° C. for high temperature strength without excessive thermal degradation in the melt.

The glass transition temperature and melting point of the polyester are determined by differential scanning calorimetry with the Perkins-Elmer Model DSC-1B. The nitrogen flow rate is set at 0.05 SCFH (1.42 liters per hour). The instrument is programmed to heat at the rate of 20° C. per minute. The midpoint of the first discontinuity of the thermogram is taken as the glass transition temperature ($T_g$). The thermogram may show an exotherm of cyrstallization and at some 150° C. above the glass transition temperature, an endotherm of fusion is observed. The principal peak of the endotherm is taken as the melting point ($T_m$).

The copolyesters, in which the 1,2-bis(hydroxyphenyl)ethane is in the range of about 90 to about 96 mol percent of the diphenol moiety, possess melting points, usually in the range of 250°–320° C. and a high glass transition temperature or $T_g$ in the range of about 110 to 180° C. These properties confer high heat distortion temperature and creep resistance on the various shapes molded from these polyesters.

The fire safety performance of a polymer is manifested in several ways including the flame resistance or resistance to ignition and propagation of flame, the degree of smoke generation on combustion and the evolution of toxic gases on combustion. A polymer of improved fire safety performance is one which is difficult to ignite, does not readily propagate a flame, generates little smoke on combustion and evolves little of the more noxious gases containing nitrogen, phosphorus or halogen which are very frequently a product of combustion of conventional flame retardant materials. Flame resistance is conveniently determined by the Underwriter's Laboratory "Test for Flammability of Plastic Materials - UL-94, Sept. 17, 1973" using the ratings which became effective Feb. 1, 1974. Test samples conforming to specified dimensional limits are ignited, after which the igniting flame is removed and the times required for both the flame and any subsequent glowing to extinguish themselves are measured. The samples are classified in order of decreasing flammability as V-II, V-I or V-O depending upon the burning and/or glowing time and whether or not the molten drippings from the sample will ignite cotton fibers placed below the sample. A rating of V-II indicates only that the solid polymer is self-extinguishing within an average time of 25 seconds, based on five trials, following removal of the igniting flame. The molten material which drips from the flaming sample may ignite untreated cotton fibers placed 12 inches (30 cm.) below the test sample. Samples which qualify as V-I are self-extinguishing within an average time of 25 seconds following removal of the igniting flame and do not drip flaming molten material that ignites cotton placed 30 cm. below the test sample. Any localized glowing must cease within 60 seconds after the second removal of the test flame, not travel up the holding clamp and be incapable of igniting surgical cotton. If the other V-I requirements are met, the flame is extinguished within an average of 5 seconds following ignition, no flaming particles are present, and glowing ceases within 30 seconds after the second removal of the test flame, the samples are rated V-O. The appropriate Underwriter's Laboratory publications should be consulted for a more complete description of the rating system employed for the UL-94 test procedure. However, these numerical flame spread ratings are not intended to reflect hazards presented by such materials under actual fire conditions. Test samples are 15 cm. × 1.3 cm. and of three thicknesses approximately 0.32 cm., 0.16 cm. and 0.08 cm. and are held in a vertical position during test. The minimum sample thickness for a V-O or a V-I rating is determined in the test.

The polyesters of the present invention can be produced by any convenient method such as by melt condensation or solvent condensation of mixtures of aromatic dicarboxylic acids and diphenol diesters selected to provide the desired fire safety performance and processability. They can be produced by melt or solution polymerization of selected mixtures of phenol esters of aromatic dicarboxyic acids and diphenols and by interfacial polymerization of salts of diphenols and aromatic dicarboxylic acid dihalides. Thus, while the combination is formally a condensate of diacid and diphenol, in practice the reactants are diacids and diphenol esters, or phenyl esters of diacids and diphenols, or salts of diphenols and diacid halides. The preferred method of preparation is the melt condensation of mixtures of aromatic dicarboxylic acids and diphenol diesters or solid state polymerization of a prepolymer.

A suitable process for the production of the polyesters comprises reacting a mixture of a 1–7 carbon aliphatic monocarboxylic acid diester of the diphenols with at least one aromatic dicarboxylic acid in the melt phase and optionally in the presence of any of the catalysts which are conventionally used in such acidolyses such as alkali metal hydroxides, phosphates, carbonates or alkanoates, titanium dioxide, orthotitanates, and organotin compounds. In general, the alkali metal salts are the preferred catalysts. The reaction is carried out under an inert atmosphere substantially free of oxygen and under such conditions of temperature and pressure that the 1–7 carbon aliphatic monocarboxylic acid produced during the reaction is separated from the reaction mixture by distillation. The diphenol diesters useful in this melt condensation process include any of those of the relatively low-boiling monocarboxylic 1–7 carbon atom acids, such as acetic, propionic, butyric, pentanoic, hexanoic or heptanoic acids, or mixtures thereof, the most preferred being acetic acid.

In more detail the preferred polycondensation process conveniently comprises contacting a mixture of the 1–7 carbon atom aliphatic carboxylic acid esters of the diphenols with the aromatic dicarboxylic acid mixture such that the reactants are in substantially stoichiometric proportions up to 10 molar percent excess of the diester or the diacid. The reaction temperature is usually from 240° to 350° C. and the pressure is atmospheric or lower. Commonly the reaction is conducted under an inert atmosphere and in the initial phase at atmospheric pressure and subsequently at a higher temperature and at lower pressure or at a series of lower pressures until essentially all of the –7 carbon atom aliphatic carboxylic acid has been removed by distillation and the polyester product has achieved a high molecular weight. For adequate strength in the polyester, the molecular weight of the polyester is preferably sufficient to provide an inherent viscosity of at least about 0.3, preferably at least about 0.5, determined at 30° C. at a concentration of 0.5 gram per 100 ml. solution in a mixed solvent containing 60 parts by weight phenol and 40 parts by weight symtetrachloroethane.

The novel 1,2-bis(hydroxyphenyl)ethane copolyesters of the present invention are useful in many forms and can be shaped in many ways to produce useful objects. They can be cast into films of high strength either from the melt of from solution in suitable solvents such as mixtures of phenol and tetrachloroethane. Those which can be oriented under stress can be melt spun and drawn into fibers of good strength. They are very useful as molding resins for the production of molded articles. The novel polyesters are comminuted into powders or extruded and pelletized and the powders or pellets can be molded by extrusion into bar or rod form. They may be injection molded into any desired shape by conventional molding equipment and machines.

An injection molding procedure found suitable for the novel 1,2-bis(hydroxyphenyl)ethane polyesters involves the use of a screw fed injection molding machine wherein the stock is maintained at a suitable temperature to provide a melt viscosity suitable for molding and the mold is maintained at a temperature in the range of about 10° to 30° C. below the glass transition temperature and preferably about 20° C. below the glass transition temperature. Any other convenient injection molding and extrusion equipment and procedures can likewise be employed with the 1,2-bis(hydroxyphenyl)ethane copolyesters described above.

For use as molding resins the novel polyesters can be blended with or can contain any of the commonly employed additives generally used with molding resins including waxes, lubricants, dyes, pigments, flame retardants, luster modifying agents and the like. Many such additives are known in the molding resin art. Their use in conjunction with the 1,2-bis(hydroxyphenyl) ethane polyester molding resins can provide advantageous results.

The criterion for tractability or processability of the polyesters is the melt viscosity determined on a capillary rheometer at a shear rate of 100 sc.$^{-1}$. For adequate processability, the polyester combination of aromatic dicarboxylic acid or admixture thereof and 1,2-bis(hydroxyphenyl)ethane or admixtures thereof should preferably be selected to provide a melt viscosity of less than about $10^5$ poise at 350° C. and preferably to provide a melt viscosity in the range of about $10^2$ to $10^5$ poise in the temperature range of 200° to 320° C. The combination is also preferably selected to provide a glass transition temperature above about 100° C. and more preferably above about 140° C. to provide a high service temperature for the polyester.

Since molding cycles are preferably rapid, it is desirable that a crystalline polyester crystallize in the short period during which the polymer is cooling in the mold. Thus, a molding material for uses where high temperature dimensional stability is important, needs to have a rapid rate of crystallization. Rate of crystallization can be determined by means of differential scanning calorimetry and rates determined by this technique are used throughout this specification when a crystallization rate is given and are expressed as the inverse of the time required for one half of the crystallization exotherm observed when a molten sample is cooled at a rate of 20° C. per minute. The apparatus used in determining the crystallization rate is a DSC-1B Thermal Analyzer (made by Perkin-Elmer Corporation, Norwalk, Connecticut) and the method of usng this apparatus is described in "Instructions, Differential Scanning Calorimeter" by Perkin-Elmer, Norwalk, Nov. 1966, pp. 7–9.

In the determination of the crystallization rate, the following procedure is used:

The instrument and recorder are turned on and set at the stand-by position and allowed to warm up for about a half hour. The instrument is then fully calibrated with respect to the differential temperature and average temperature as suggested in the Perkin-Elmer Instruction Manual. About 5 to 10 milligrams of the polymer sample is crimped in a non-hermetic pan and lid with the encapsulating tool, making sure that the bottom remains flat. An empty non-hermetic pan and lid are crimped in the same manner. The sample and the reference are placed in the right and left sensors of the DSC-1B. The sample cover is placed in position and the nitrogen flow is adjusted to about 0.05 SCFH (1.42liters per hour). The range of the DSC-1B is set to 4 mcal per second, the scan rate to 10° C. per minute and the chart speed of the recorder to 2.54 cm. per minute. The "zero" of the instrument is adjusted so that the recorder pen is at a convenient position on the chart. The recorder is turned to "on" position and the baseline is recorded at room temperature. The green indicator light on the instrument is on indicating temperature control and the baseline recorded will be horizontal when thermal equilibrium is reached between sample and instrument. The program toggle switch is then placed in the increase position and the sample is scanned upwards to about 10° above the endothermic melting peak at the set rate of 10° C. per minute. The toggle switch is placed at the neutral position and let stay for two minutes. While the sample is held isothermal for two minutes, the scan rate dial is reset to 20° C. per minute and the recorder speed to 5.08 cm. per minute. The program toggle switch is placed in decrease position and the sample is cooled at the set rate of 20° C. per minute. The green indicator light of the instrument shows the temperature is in control. Exothermic crystallization peak (or peaks) should be seen on the recorder thermogram if crystallization occurs within the time interval of the scan. The scan is continued beyond the peak so that the baseline is reestablished and the thermogram is complete. A typical exothermic crystallization peak is set forth in FIG. 1.

The baseline of the thermogram is interpolated on either side of the crystallization peak (or peaks). The baseline may show curvature due to the instrument. In that case, an appropriate French curve has to be used for interpolation. The point [S] at which the baseline first deviates to form the peak is determined and also the point [E] at which the peak (or final peak) finishes to rejoin the baseline. The former indicates the start, while the latter the end of the crystallization process. Perpendiculars are dropped from point [S] and point [E] to cut the temperature axis of the thermogram at $T_S$ and $T_E$ respectively. The total area [A] under the peak (or peaks) confined by [S] and [E] is measured with a planimeter. Area [A] is proportional to the heat of crystallization of the sample. The total time required for crystallization is given by:

$$\frac{T_S - T_E}{\text{cooling rate}} \text{ min.} = \frac{T_S - T_E}{20} \text{ min.}$$

The peak (or peaks) whose total area [A] has been measured, is sliced into several segments by dropping perpendiculars from different points [$B_j$] on the peak (or peaks) to cut the interpolated baseline at [$C_{fi}$ and the temperature axis of the thermogram at 4° intervals [$T_{ci}$ etc.]. The area [$A'$] of each segment [$SB_iC_i$, $SB_2C_2$] is measured with a planimeter and the corresponding time of crystallization is calculated:

$$\frac{T_s - T_{ci}}{\text{cooling rate}} \text{ min.} = \frac{T_s - T_{ci}}{20} \text{ min. etc.}$$

The area of each segment is divided by the total area of the peak (or peaks) [$A$] and the results are expressed in percentages. The percent of crystallization peak area is plotted against crystallization time. The half time or the time at which [$A'$] is 50 percent of [$A$] is established from the graph. The rate of crystallization of the sample is the reciprocal of this "half time," e.g., if the half time is 5 minutes, the reciprocal is 0.2 min$^{-1}$.

The "rate of crystallization" or "crystallization rate" as used throughout this specification and claims is therefore understood to be that rate determined as set forth above on a DSC-1B Thermal Analyzer using a cooling rate of 20° C. per minute unless a different cooling rate is specified. A rate of crystallization of about 0.2 minutes$^{-1}$ or greater as determined by this method is satisfactory in injection molding of polymers because the cooling rate in the molding operation is generally much faster than the cooling rate used in the determination of rate of crystallization. However, a crystallization rate of about 0.5 minutes $^{-1}$ or greater is more preferable and for rapid molding cycles a crystallization rate of about 1 minute$^{-1}$ or greater is even more preferred.

When the polyesters are subjected to high service temperatures for extended periods, they are exposed to the oxidizing effect of the ambient air. Thus, in use, the polyesters can be subjected to an oxidizing atmosphere at temperatures up to and even above their glass transition temperature. In an accelerated test to determine the oxidation resistance of the polyesters, pieces of molded film 0.25 mm in thickness are placed on microscope slides which are inserted in a metal block which is heated electrically to a temperature of 250° C. in about 15 seconds. Four slides can be inserted at one time to allow duplicate samples to be run. The samples are removed at suitable intervals and tested for solubility in a solvent blend of phenol and sym-tetrachloroethane in a weight ratio of 60:40. The time to development of insolubility is taken as a measure of the oxidation resistance. The polyesters of the present invention show superior oxidation resistance in comparison with polyesters containing no sulfide units and in comparison with polyesters in which the diphenol units are entirely bis(hydroxyphenyl)sulfide units.

The crystalline polyesters of the invention have been found to possess excellent resistance to chemical attack. They demonstrate negligible weight loss after prolonged exposure to non-polar and medium polarity solvents such as hexane, trichloroethane, acetone and methylethyl ketone. They resist attack by acids, bases and water. Likewise, they do not demonstrate environmental stress cracking when exposed as molded samples to those solvents.

This invention is further illustrated but is not intended to be limited by the following examples in which ratios of monomers are mol ratios and all other parts and percentages are by weight, unless otherwise specified.

The Examples illustrate the preparation of the 1,2-bis(hydroxyphenyl)ethane polyesters of this invention. All inherent viscosities are determined at 30° C. at a concentration of 0.5 g. per 100 ml. in a mixed solvent system of 60/40 phenol/sym-tetrachloroethane by weight. The oxidation resistance and fire safety performance of the polymers are determined by the methods described above.

Examples 3, 4, 5 and 6 are within the scope of the invention. Examples 1, 2 and 7 are used for comparative purposes.

EXAMPLE 1

PREPARATION OF POLY(1,2-BIS(4-HYDROXYPHENYL)ETHANE ISOPHTHALATE

A charge consisting of 82 parts of isophthalic acid and 148 parts of 1,2-bis(4-acetoxyphenyl)ethane and 0.005 moles sodium carbonate per mole of 1,2-bis(4-acetoxyphenyl)ethane is placed in a reaction vessel equipped with a stirrer, condenser and receiver. The vessel is evacuated and purged with nitrogen three times. A nitrogen blanket is maintained in the reactor while it is heated to 250° C. for about three hours during which period approximately 35 to 40 parts of acetic acid distills. Thereupon the vessel is evacuated to a pressure of about 200 torr for about 5 minutes and the pressure is slowly reduced to about 1 torr while the temperature is increased to about 290° C. When the amperage on the stirrer motor increases by 0.02 to 0.04 amps, the stirrer motor is switched off and the vacuum is released with nitrogen. From 95 to 97 percent of the theoretical amount of acetic acid is collected. The polymer is extruded from the vessel under slight nitrogen pressure and is reduced in a Thomas mill to a powder of particle size in the range of about 0.1 to 0.25 mm. The inherent viscosity is about 0.3. The powder is charged to a reaction vessel which is then purged with nitrogen. The pressure is reduced to 0.1 to 0.2 torr. and the temperature is raised to about 10° to 15° C. below the melting point of the polymer. Heating is continued for 12 hours. The vessel is cooled and the crystalline polymer is discharged. The inherent viscosity of the polymer is 0.90. The polymer melts at 279°–290° C. The rate of crystallization is 2.56 min.$^{-1}$.

EXAMPLE 2

Example 1 is repeated with an equivalent amount of bis(4-acetoxyphenyl)sulfide substituted for 2 mole percent of the 1,2-bis(4-acetoxyphenyl)ethane. The inherent viscosity of the polymer is 0.76. The polymer melts at 274°–284° C.

EXAMPLE 3

Example 1 is repeated with an equivalent amount of bis(4-acetoxyphenyl)sulfide substituted for 4 mole percent of the 1,2-bis4-acetoxyphenyl)ethane. The inherent viscosity of the polymer is 0.84. The polymer melts at 267° C.

EXAMPLE 4

Example 1 is repeated with an equivalent amount of bis(4-acetoxyphenyl)sulfide substituted for 5 mole percent of the 1,2-bis(4-acetoxyphenyl)thane. The inherent viscosity of the polymer is 0.83. The polymer is crystalline.

EXAMPLE 5

Example 1 is repeated with an equivalent amount of bis(4-acetoxyphenyl)sulfide substituted for 6 mole percent of the 1,2-bis(4-acetoxyphenyl)ethane. The inherent viscosity of the polymer is 1.17. The polymer melts at 263°–7° C.; the $T_g$ is 151° C. The crystallization rate is 1.78 min.$^{-1}$.

EXAMPLE 6

Example 1 is repeated with an equivalent amount of bis(4-acetoxyphenyl)sulfide substituted for 10 mole percent of the 1,2-bis(4-acetoxyphenyl)ethane. The inherent viscosity of the polymer is 1.13. The polymer melts at 252°–7° C.; the $T_g$ is 153° C. The crystallization rate is 2.13 min.$^{-1}$.

EXAMPLE 7

Example 1 is repeated with bis(4-acetoxyphenyl)sulfide substituted for the 1,2-bis(acetoxyphenyl)ethane. The polymer is amorphous.

Samples of the polymers are subjected to an accelerated high temperature oxidation test by the procedure set forth hereinabove. The data are presented in Table I and demonstrate the improved oxidation resistance of polymer Examples 3, 5 and 6 which are within the scope of the invention.

TABLE I

COMPARISON OF OXIDATION RESISTANCE OF POLYESTERS OF 1,2-BIS(4-HYDROXYPHENYL)ETHANE

| Example | Composition, mole ratio | | | Time to Develop Insolubility at 250° C. min. |
|---|---|---|---|---|
| | IA | BHPE | BHPS | |
| 1 | 50 | 50 | — | 1.5 |
| 2 | 50 | 49 | 1 | 0.25 |
| 3 | 50 | 48 | 2 | 1.5 |
| 5 | 50 | 47 | 3 | 3.5 |
| 6 | 50 | 45 | 5 | 3.5 |
| 7 | 50 | — | 50 | 1.5 |

IA - isophthalic acid
BHPE - 1,2-bis(4-hydroxyphenyl)ethane
BHPS - bis(4-hydroxyphenyl)sulfide Sample of polymers of Examples 1, 4 and 7 are molded in thicknesses of 1.58 mm. and 0.80 mm. The samples are then subjected to the UL-94 test and the average times of flame out in successive burns and the average time of afterglow is determined. The date of Table 2 show that the 1,2-bis(4-hydroxyphenyl)ethane polyesters of Examples 1 and 4 are superior in fire safety performance to the bis(4-hydroxyphenyl)sulfide polyester of Example 7. Furthermore, Example 4 prepared from 1,2-bis(4-hydroxyphenyl)ethane containing 5 mole percent bis(4-hydroxyphenyl)sulfide is superior in suppression of afterglow after the termination of flaming combustion in comparison with the polyester of 1,2-bis(4-hydroxyphenyl)sulfide (Example 1).

TABLE 2

Comparison Of Fire Safety Performance Of Polyarylene Esters

| Example | Composition, mole ratio | | | Sample, thickness mm. | Average Flame out Time, Second, Burns, secs. | Average Afterglow Time, Secs. | UL-94 Designation |
|---|---|---|---|---|---|---|---|
| | IA | BHPE | BHPS | | | | |
| 1 | 50 | 50 | — | 0.80 | 6.0 | 23 | V-O |
| 4 | 50 | 47.5 | 2.5 | 1.58 | 2.0 | 2.5 | V-O |
| | | | | 0.80 | 3.0 | <1 | V-O |
| 7 | 50 | — | 50 | 1.58 | flaming drip | — | 2 |

IA - isophthalic acid
BHPE - 1,2-bis(4-hydroxyphenyl)ethane
BHPS - bis(4-hydroxyphenyl)sulfide

What is claimed is:

1. A linear polyarylene ester consisting essentially of the condensation product of an aromatic dicarboxylic acid and a diphenol wherein the aromatic dicarboxylic acid comprises at least one acid selected from the group consisting of isophthalic acid, terephthalic acid, bis(4-carboxyphenyl)ether, bis(4-carboxyphenyl)sulfone, bis(4-carboxyphenyl)methane, and 1,2-bis(4-carboxyphenyl)ethane and wherein the diphenol comprises from about 75 to 96 mole percent 1,2-bis(4-hydroxyphenyl)ethane, from about 4 to 20 mole percent of a bis(hydroxyphenyl)sulfide and from about 21 to 0 mole percent of at least one diphenol selected from the group consisting of 1,2-bis(3-hydroxyphenyl)ethane, 1-(3-hydroxyphenyl)-2-(4-hydroxyphenyl)ethane, bis(4-hydroxyphenyl)propane, bis(4-hydroxyphenyl)ether, and bis(4-hydroxyphenyl)sulfone.

2. The linear polyester of claim 1 wherein the inherent viscosity at 30° C. determined at a concentration of 0.5 gram polyester per 100 ml. solution in a solvent mixture of 60 parts by weight of phenol and 40 parts by weight of sym-tetrachloroethane, is at least about 0.3.

3. A crystalline linear polyarylene ester of melting point less than about 350° C. consisting essentially of the condensation product of an aromatic dicarboxylic acid and a diphenol wherein the aromatic dicarboxylic acid comprises at least one acid selected from the group consisting of isophthalic acid, terephthalic acid, bis(4-carboxyphenyl)ether, bis(4-carboxyphenyl)sulfone, bis(4-carboxyphenyl)methane and 1,2-bis(4-carboxyphenyl)ethane and wherein the diphenol comprises from about 75 to 96 mole percent 1,2-bis(4-hydroxyphenyl)ethane, from about 4 to 20 mole percent bis(4-hydroxyphenyl)sulfide and from about 21 to 0 mole percent of a diphenol selected from te group consisting of 1,2-bis-(3-hydroxyphenyl)ethane, 1-(3-hydroxyphenyl)-2-(4-hydroxyphenyl)ethane, bis-(4-hydroxyphenyl)methane, bis(4-hydroxyphenyl)ether, and bis(4-hydroxyphenyl)sulfone; wherein the $T_g$ of the polyester is greater than about 100° C.; wherein the inherent viscosity of the polyester at 30° C. determined at a concentration of 0.5 gram polyester per 100 ml. solution in a solvent mixture of 60 parts by weight of phenol and 40 parts by weight of sym-tetrachloroethane, is at least about 0.5; and wherein the crystallization rate of the polyester is greater than about 0.2 min$^{-1}$.

4. A readily crystallized linear polarylene ester of melting point less than about 350° C. consisting essentially of the condensation product of an aromatic dicarboxylic acid and a diphenol wherein the aromatic dicarboxylic acid comprises at least one acid selected from the group consisting of isophthalic acid, terephthalic acid, bis(4-carboxyphenyl)ether, bis(4-carboxyphenyl)sulfone, bis(4-carboxyphenyl)methane and 1,2-bis(4-carboxyphenyl)ethane and wherein the diphenol comprises from about 90 to 96 mole percent 1,2-bis(4-hydroxyphenyl)ethane and from about 4 to 10 mole percent bis(4-hydroxyphenyl)sulfide; wherein the $T_g$ of the polyester is greater than about 100° C.; wherein the inherent viscosity of the polyester at 30° C. determined at a concentration of 0.5 gram polyester per 100 ml.

solution in a solvent mixture of 60 parts by weight of phenol and 40 parts by weight of sym-tetrachloroethane, is at least about 0.5; and wherein the crystallization rate of the polyester is greater than about 0.2 min$^{-1}$.

5. The polyarylene ester of claim 4 wherein the crystallization rate is greater than 0.5 min$^{-1}$.

6. A crystalline linear polyarylene ester consisting essentially of the condensation product of an aromatic dicarboxylic acid and a diphenol, wherein the aromatic dicarboxylic acid comprises at least about 67 mole percent of isophthalic acid and wherein the diphenol comprises from about 90 to 96 mole percent 1,2-bis(4-hydroxyphenyl)ethane and from about 4 to 10 mole percent bis(4-hydroxyphenyl)sulfide; wherein the $T_g$ of the polyester is greater than about 100° C.; wherein the inherent viscosity at 30° C. determined at a concentration of 0.5 gram polyester 100 ml. solution in a solvent mixture of 60 parts by weight of phenol and 40 parts by weight of sym-tetrachloroethane, is at least about 0.3; and wherein the crystallization rate of the polyester is greater than about 0.2 min$^{-1}$.

7. The polyarylene ester of claim 6 wherein the inherent viscosity is at least about 0.5.

8. A crystalline linear polyisophthalate of a mixture of diphenols comprising from about 90 to 96 mole percent 1,2-bis(4-hydroxyphenyl)ethane and from about 4 to 10 mole percent bis(4-hydroxyphenyl)sulfide; wherein the inherent viscosity at 30° C. determined at a concentration of 0.5 gram polyisophthalate per 100 ml solution in a solvent mixture of 60 parts by weight of phenol and 40 parts by weight of sym-tetrachoroethane, is at least about 0.3.

9. The polyisophthalate of claim 8 wherein the inherent viscosity is at least about 0.5.

10. A molding powder comprising the polyarylene ester of claim 1.

11. A molding powder comprising the polyarylene ester of claim 3.

12. A molding powder comprising the polyarylene ester of claim 4.

13. A molding powder comprising the polyarylene ester of claim 6.

14. A molding powder comprising the polyarylene ester of claim 8.

15. A shaped article formed from the molding powder of claim 10.

16. A shaped article formed from the molding powder of claim 11.

17. A shaped article formed from the molding powder of claim 12.

18. A shaped article formed from the molding powder of claim 13.

19. A shaped article formed from the molding powder of claim 14.

* * * * *